United States Patent
Hoffmann

(10) Patent No.: US 8,788,443 B2
(45) Date of Patent: Jul. 22, 2014

(54) AUTOMATED OBSERVATIONAL DECISION TREE CLASSIFIER

(75) Inventor: Florian Hoffmann, Schwetzingen (DE)

(73) Assignee: SAP AG, Walldorf (DE)

( * ) Notice: Subject to any disclaimer, the term of this patent is extended or adjusted under 35 U.S.C. 154(b) by 349 days.

(21) Appl. No.: 13/336,083

(22) Filed: Dec. 23, 2011

(65) Prior Publication Data

US 2013/0166485 A1    Jun. 27, 2013

(51) Int. Cl.
*G06F 15/18* (2006.01)
*G06N 3/04* (2006.01)
*G06K 9/62* (2006.01)

(52) U.S. Cl.
CPC .............. *G06N 3/04* (2013.01); *G06K 9/6282* (2013.01)
USPC .......................................................... 706/20

(58) Field of Classification Search
CPC ......... G06N 99/005; G06N 3/08; G06N 3/04; G06F 17/30707; G06K 9/00208; G06K 9/00228; G06K 9/6257; G06K 9/6282
See application file for complete search history.

(56) References Cited

U.S. PATENT DOCUMENTS

2004/0258313 A1 * 12/2004 Jones et al. .................... 382/224
2007/0086660 A1 *  4/2007 Ai et al. ......................... 382/226

OTHER PUBLICATIONS

Jones et al. "Fast Multi-view Face Detection", Mitsubishi Electric Research Laboratories, TR2003-96, 2003, pp. 11.*
Yuan et al. "Automatic Video Classification Using Decision Tree Method", ICMLC, 2002, pp. 5.*

* cited by examiner

*Primary Examiner* — Li-Wu Chang

(57) ABSTRACT

Various embodiments of systems and methods for automatic classification of objects in a computer system are described herein. A class decision is received, where the class decision is a classification of an object from a number of objects to a class from a number of classes. The class decision is classification of the object by a role model. An exploration tree is expanded based on the class decision. A decision tree is constructed based on the exploration tree. Objects are classified based on said decision tree.

17 Claims, 17 Drawing Sheets

AUTOMATED OBSERVATIONAL DECISION TREE CLASSIFIER

FIELD

Embodiments of the invention generally relate to the software arts. More specifically, to machine learning.

BACKGROUND

Learning in humans is a complex process composed of various aspects. One aspect is memorization of data such as faces, facts, letters, sounds, formulae, etc. Another aspect is ability comprehend, to recognize and to generalize notions from various sources such as books, lectures, television, Internet, etc. Finally, humans learn from accumulated knowledge and, by reasoning, arrive at conclusions about new, e.g., unseen information. In general, humans also use intuition, experience, creativity and other subjective criteria to perform intelligent tasks. Machine learning aims at automating intelligent tasks in computer systems using reasoning, to infer new information from old. Common goal is to replicate humans' pattern recognition and classification skills in computer systems.

A typical task addressed in the field of machine learning is classification. This is the process of assigning an input object to one class from a set of classes, for example, to determine whether a given email is "spam" or "non-spam". Usually, classification of objects in computer systems is based on training data as input data. Training data contains samples or instances of objects assigned the correct classification. For example, a number of exemplary mails classified as "spam". Information about the objects is also entered into the computer system. For example, objects may be formally represented by features, which constitute properties or characteristics of the objects. The set of features used to describe the objects is referred to as the feature space. Classified sample objects and their features are analyzed to learn decision criteria based on which the sample objects are put into certain classes. Example features that may be used to classify mails may be "sender", "content" such as terms occurring in the mail, etc.

The complexity of the feature space imposes limitations on the performance of automatic classification. For example, selecting from the feature space those features that are important and have discriminative potential cannot readily be done. Reducing the feature space while also choosing the important and informative set of features for the classification can be a challenging and computationally expensive task.

SUMMARY

Various embodiments of systems and methods for automatic classification of objects in a computer system are described herein. In one aspect, a class decision is received, where the class decision is a classification of an object from a number of objects to a class from a number of classes. In a further aspect, the class decision is classification of the object by a role model. Furthermore, an exploration tree is expanded based on the class decision. The exploration tree represents a number of view sequences of the role model. In one aspect, the classified object is assessed in a view sequence from the number of view sequences by the role model. The exploration tree is expanded by merging the view sequence to the exploration tree. Nodes of the exploration tree represent a number of views and a view represents features of the objects. Leaves of the exploration tree represent the classes. A decision tree is constructed based on the exploration tree. In one aspect, the exploration tree is pruned to optimize the decision tree. Objects are classified based on said decision tree. In one aspect, to build the decision tree, a number of miniature decision trees for nodes of the exploration tree are constructed and connected in the decision tree.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
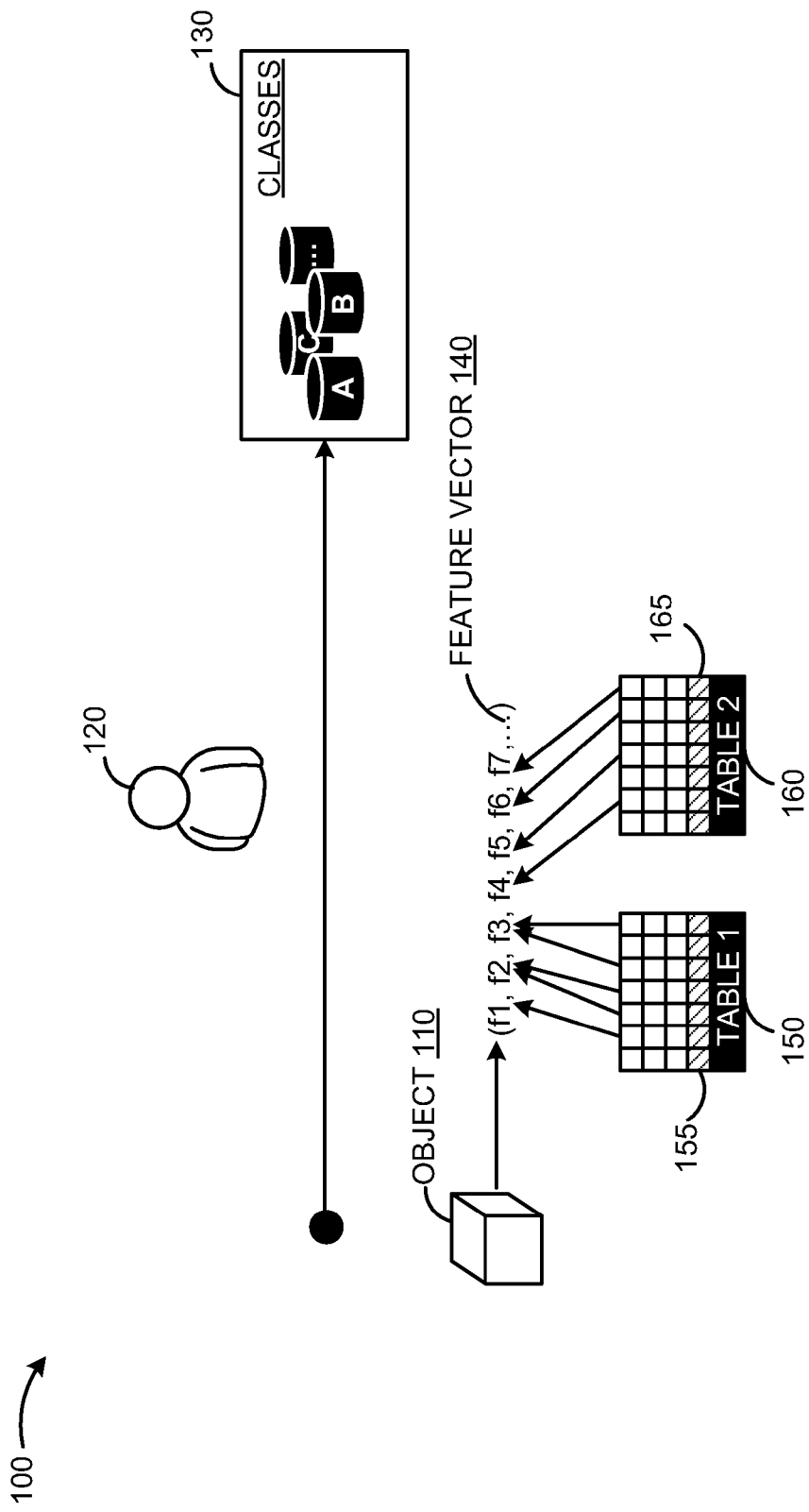
FIG. 1 illustrates a classification setting of an object to be assessed by a role model, according to one embodiment.

Embodiments of techniques for automated observational decision tree classifier are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

In one embodiment, an automated classifier of data objects based on a decision tree is implemented. The automated classifier reproduces a human user classification process performed in a computer system. The human user's interaction with the system to classify the objects is tracked, observed and analyzed to be replicated automatically in the computer system. The automated classifier enables automatic classification of new and unclassified objects. In one embodiment, the automated decision tree classifier is based on observing a human user performing classifications. In yet another embodiment, the automated decision tree classifier may be built based on observing a computer system classifying objects.

Data objects are stored in a computer system to be classified. A data object may be any entity physical or abstract that may be classified. For example, objects may represent physical items on a conveyor belt, people, animals or abstract entities such as corporations. A data object is assigned an object identifier (ID) to be identified in a computer system. In an embodiment, data objects are described by features. Features of an object may be represented as a feature vector. A feature may be any characteristic, property or attribute of a data object. For example, height or weight of a physical item, number of occurrences of a term in a text, physical features of humans such as hair color, skin color, eyes, scars, or physical attributes of animals such as number of legs or if the animal lays eggs, etc. Classification of objects is based on features of the objects. Classes may be any category suitable to describe the data objects. For example, animals may be classified as birds, mammals, amphibians, reptiles, etc. A class is assigned a class identifier (ID) to be identified in a computer system. In an embodiment, data objects are represented as data records in one or more tables. Data records of a table contain data about the data objects that is represented by fields. In an embodiment, features may be fields in the data records or derived from one or more such fields. For example, a feature may be computationally derived from fields such as the age of a person may be derived from the person's date of birth. In one embodiment, data about objects may be kept in a permanent data store.

FIG. 1 illustrates a classification setting 100 of object 110 to be assessed by a role model 120, according to one embodiment. Role model 120 may be a human expert user that classifies data objects in a computer system. Classifications of the role model 120 are assumed to be correct categorizations of the classified data objects. A class decision represents assigning an object to a class. In one embodiment, a class decision is a decision by a role model to classify a data object into a class. Class decisions of role model 120 are observed and analyzed as exemplar decisions to be reproduced by an automated classifier. In one embodiment, object 110 is described in the computer system by features. For example, features of object 110 are represented in feature vector 140. In one embodiment, data related to object 110 is stored in tables such as tables 150 and 160. Features from feature vector 140 of object 110 may be mapped from one or more columns of tables 150 and 160. Data values of the features are represented as fields in data records of tables 150 and 160. For example, data values of features from feature vector 140 are kept in one or more fields of data records 155 and 165. In one embodiment, the data value of a feature such as feature "f2" may be derived from one or more fields such as fields 155. In one embodiment, a field in tables 150 and 160 may be an object identifier. For example, one field in data record 155 may be object ID of object 110. Classifying object 110 into classes (e.g., 130) by role model 120 is based on one or more features from feature vector 140 of the object 110. In one embodiment, class decisions of the role model 120 serve as a source for decision tree rules of the automated decision tree classifier. For example, the decision to classify object 110 into class "A" is generated as input training data to the automated classifier.

Figure 2:
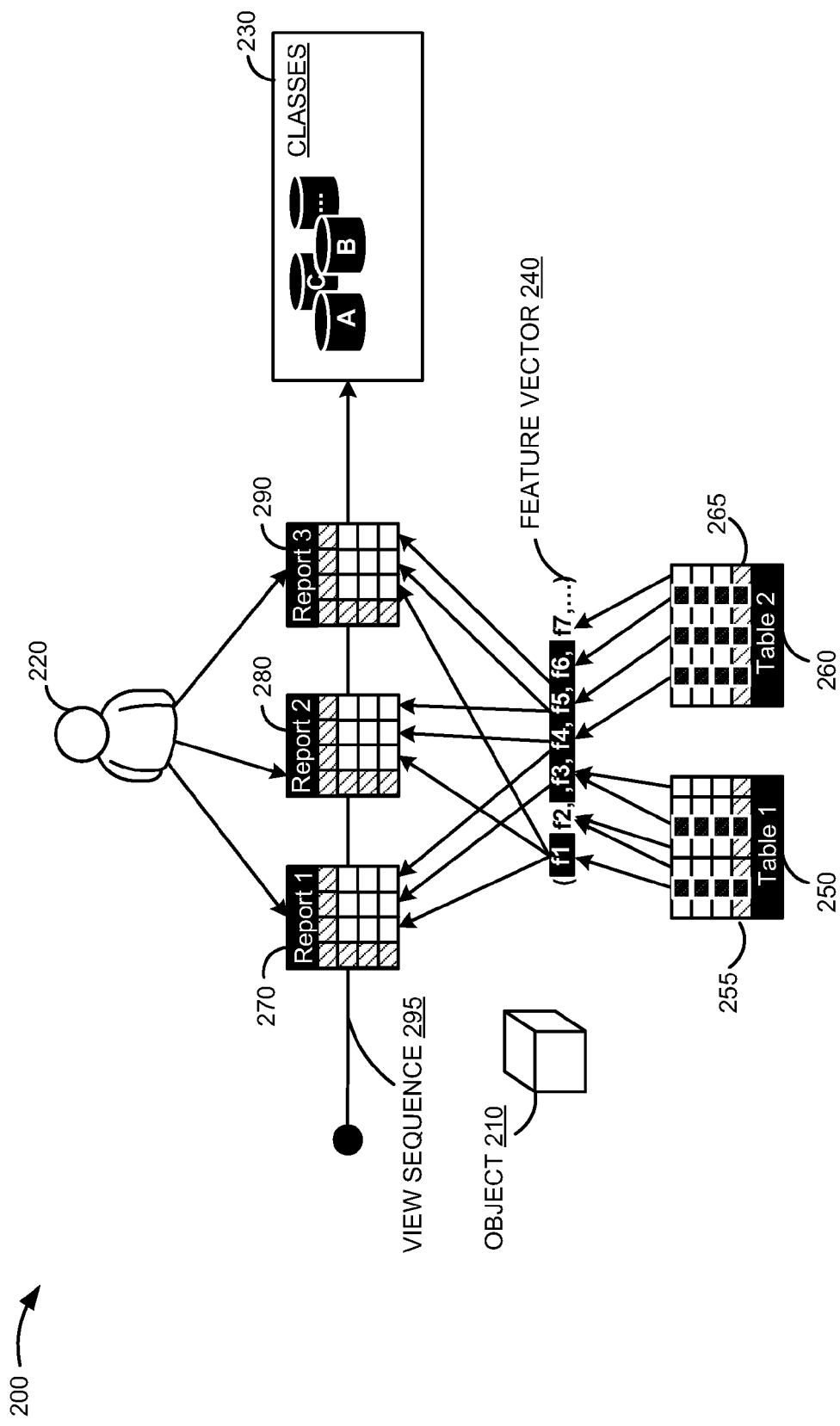
FIG. 2 illustrates assessment of an object to be classified by a role model, according to one embodiment.

FIG. 2 illustrates an assessment process 200 of a role model 220 classifying an object 210, according to one embodiment. To classify a target object 210, role model 220 assesses or inspects the target object 210 in a view sequence 295. A view sequence is a succession of one or more views (e.g., 270, 280 and 290) of a target object 210. A view of a target object 210 represents a subset of features of the target. For example, view 270 represents features "f1", "f3", and "f4" from feature vector 240 of object 210; view 280 includes features "f1", "f4", and "f5"; and view 290 represent features "f1", "f5", and "f6". Data values of selected features in views 270-290 may be derived from data record 255 and 265 of table 250 and table 260, respectively. In one embodiment, views 270-290 of target data object 210 may be reports. The view sequence 295 represents the views 270-290 of the target object 210 in the order of their assessment by the role model 220, for example, first view 270, second view 280 and last view 290, respectively. In one embodiment, a view may represent a subset of features of one or more target objects. The role model determines the views and the order in which the views are assessed. For example, role model 220 determines which features from feature vector 240 of object 210 should be selected for assessment. Based on the view sequence 295, role model 220 may decide to classify object 210 into one or more classes from classes 230. In one embodiment, an initial view may contain a set of objects to be picked for assessment by the role model 220.

Figure 3:
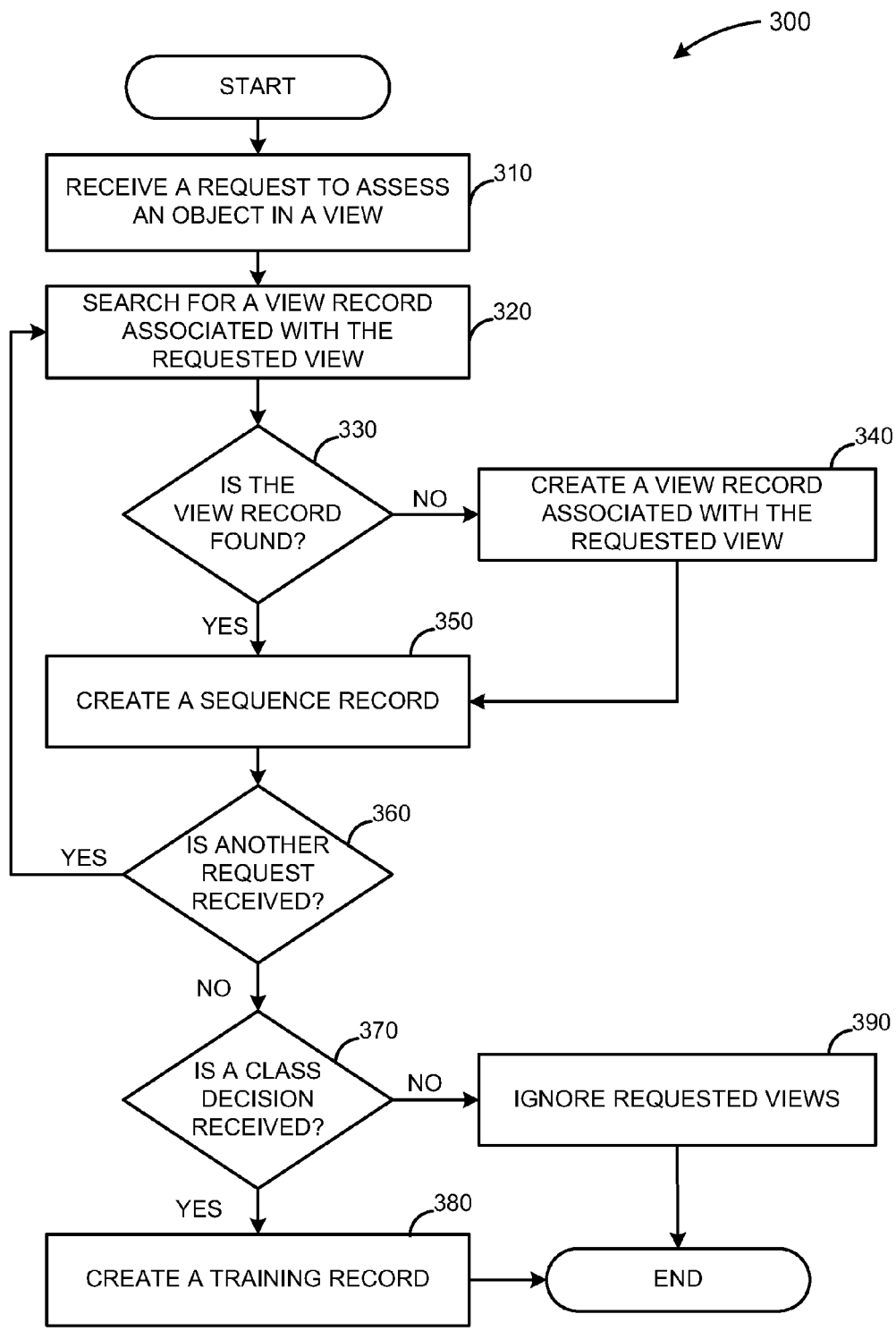
FIG. 3 illustrates an observing process of a role model's classification of an object, according to one embodiment.
Figure 4:
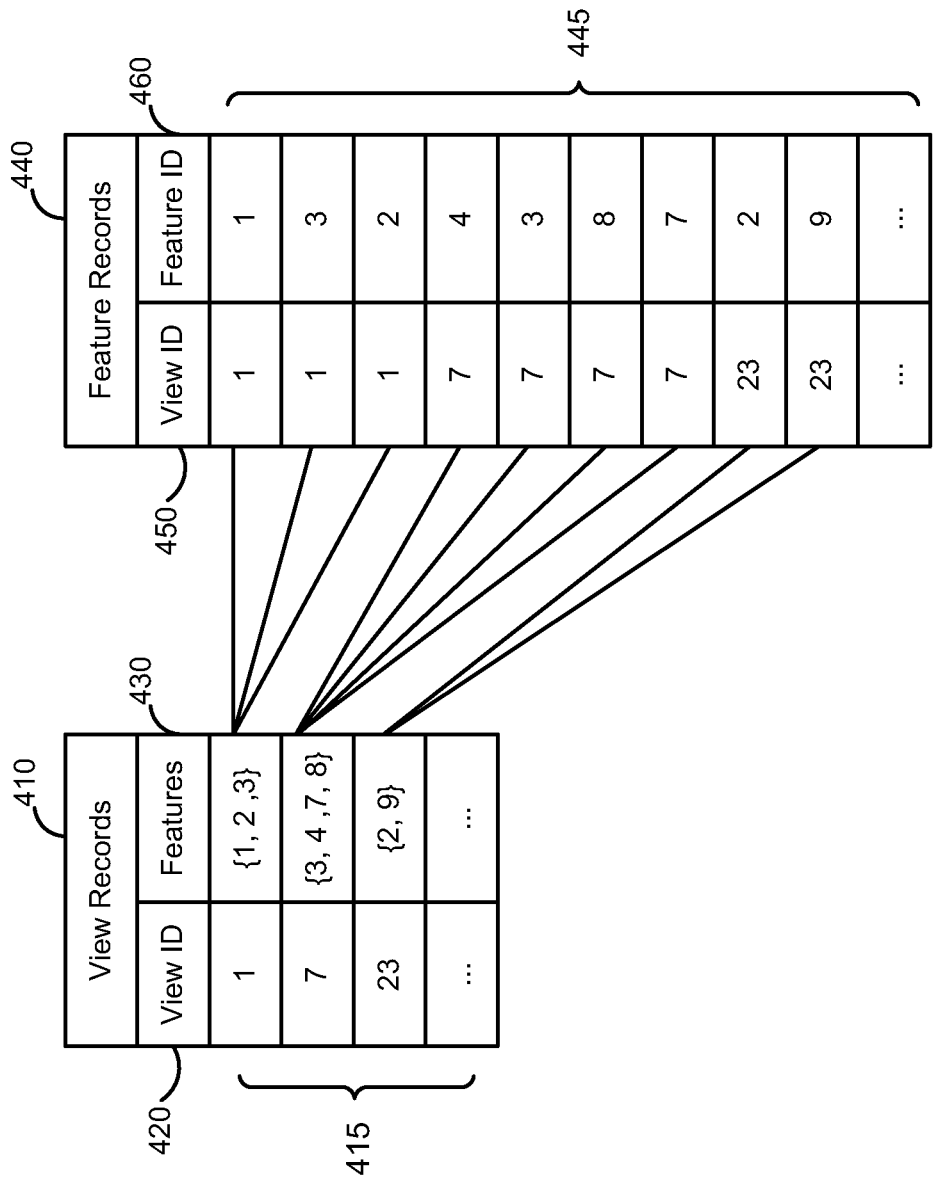
FIG. 4 illustrates exemplary view records, according to one embodiment.

FIG. 3 illustrates observing process 300 of a role model classifying an object, according to one embodiment. At 310, a request to assess an object in a view is received. The role model requests to inspect a subset of features of the object in the view. In one embodiment, in response to the request, a query to retrieve data about the features and the object is submitted to a permanent data store in a computer system. For example, a query may specify the requested features of the object and the object ID. In one embodiment, the query retrieves the requested information from tables (e.g., 150 and 160) that may be kept in a permanent data store. Queries may be implemented in various ways including, but not limited to, script languages such as SQL, data interchange protocols such as SAP Data, and any other data source access methods. At 320, in response to the request, a view record associated with the requested view is searched for. For example, the view record may be searched for by a query submitted to the permanent data store. A view record includes a view identifier (ID) to identify a view and features associated with that view. For example, a view record may be a data record that includes a field containing the view identifier and a field containing the features associated with the view. Exemplary view records are illustrated in FIG. 4.

At 330, a check is performed whether a view record associated with the requested view is found. If a view record associated with the requested view is not found in the permanent data store, at 340, such record is created. For example, the requested view is assigned an identifier and the requested features of that view are associated with that view ID in a view record. At 350, a sequence record is created based on the requested view of the object. A sequence record is an association between an object and a requested view of that object and also includes the order in which the view is requested. The order in which the view is requested may be defined according to temporal succession. In one embodiment, a sequence record may be a data record that includes a field containing an object identifier of a target object, a field containing a view ID of a requested view of that object, and a field containing order of request of that view for that object. Table 1 below illustrates exemplary sequence records.

TABLE 1

Sequence Records

| Object ID | Order | View ID |
|---|---|---|
| 4711 | 1 | 7 |
| 4711 | 2 | 1 |
| 4711 | 3 | 23 |
| ... | ... | ... |

Table 1 illustrates sequence records of exemplary target object. Field "Object ID" contains the object ID of the target object and the field "View ID" contains the view ID of the requested view of the target object. Field "Order" represents the order of sequence records associated with the same object ID according to the temporal succession. For example, target object with an object ID "4711" is assessed in views with view IDs "7", "1", and "23", where the views are requested and assessed in the respective order. The sequence order may be represented as convenient, for example, as a timestamp or as a sequential integer as illustrates in Table 1. Sequence records of a target object may be represented as a view sequence.

At 360, a check is performed if another request to assess the object in a view is received. If another request to assess a view of the object is received, the process repeats at 320. In one embodiment, if the requested view of the object matches with the view requested last according to the order, a sequence record at 340 is not created. For example, two successive identical queries result in one sequence record. If another request to assess a view of the object is not received, at 370, a check is performed to determine whether a class decision is received. A class decision represents assigning an object to a class. If a class decision is received, at 380 a training record based on the class decision is created. In one embodiment, a training record is created in the permanent data store. Table 2 below illustrates exemplary training records of target objects.

TABLE 2

Training Records

| Object ID | Class ID |
|---|---|
| 4711 | A |
| 4712 | B |
| 4715 | C |
| ... | ... |

A training record is a data record that includes a field containing an object ID of an object and a field containing a class ID of the class to which the object is assigned. In table 2, field "Object ID" contains object IDs of target objects and field "Class ID" contains class IDs corresponding to classes assigned to the target objects. In an embodiment, if a class decision is not received, at 390, requested views are ignored. For example, a view sequence based on the requested views is not generated. In an embodiment, a class that indicates that a class decision is not made may be included. For example, a role model after assessing a target object in a view sequence, may decide not to make a class decision and, as result, putting the object in category "unclassified". In an embodiment, the computer system may automatically categorize objects as "unclassified" if a role model interrupts the process of assessing the object without submitting a class decision.

FIG. 4 illustrates exemplary view records 410, according to one embodiment. View records 410 include a field 420 that contains a view ID to identify views and a field 430 that contains features that are associated with corresponding views. View records 410 are represented as data records 415. In one embodiment, data records representing view records may not be stored in a permanent data store. For example, view records may be determined based on feature records such as feature records 440. A feature record includes a view ID to identify a view and a feature identifier (ID) to identify a feature that is associated with that view. For example, feature records 440 include a field 450 representing view IDs and a field 460 representing feature IDs. A feature record from feature records 440 may be represented as a data record from data records 445 that include a field containing the view ID and a field containing a feature associated with the view. In one embodiment, a computer system determines view records 410 based on features records 440. For example, data record from data records 415 with view ID "1" and features "{1, 2, 3}" is computed based on data records from data records 445 with the same view ID "1".

Figure 5:
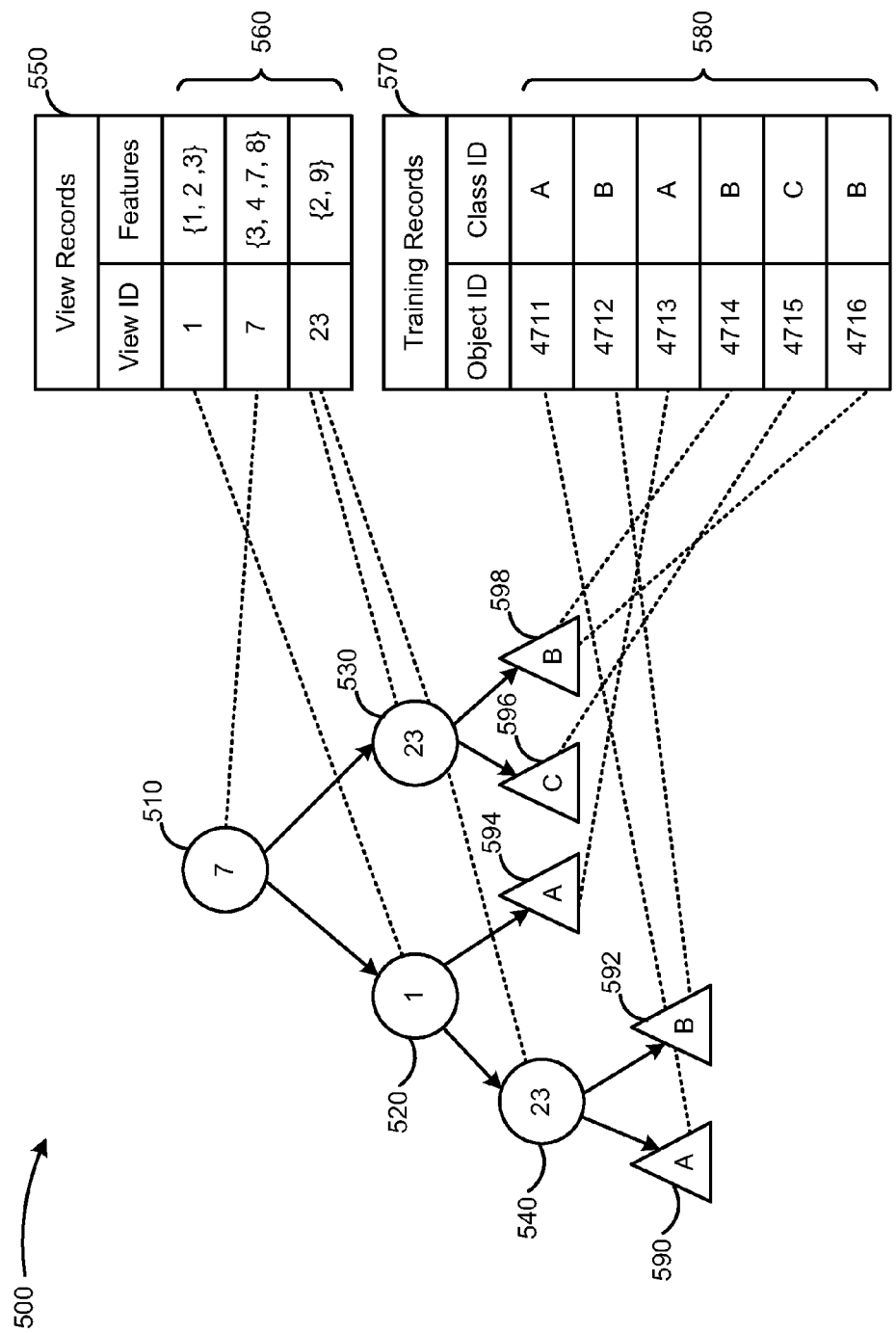
FIG. 5 illustrates an exemplary exploration tree, according to one embodiment.

FIG. 5 illustrates an exemplary exploration tree 500, according to one embodiment. An exploration tree represents view sequences that are assessed by a role model to classify objects. Exploration tree 500 is built based on class decisions submitted by a role model and corresponding sequence records. Nodes of an exploration tree represent views. Nodes 510-540 are associated with view records 550 of assessed views, for example, view records 550. A node of an exploration tree represents a view record and is identified by a corresponding view ID of the view record. For example, node 510 represents a view record of view records 565 with view ID "7"; node 520 represents a view record of view records 565 with view ID "1"; node 530 represents a view record of view records 560 with view ID "23"; node 540 represents view with view ID "23" as node 530.

In one embodiment, nodes of an exploration tree may represent the same view record. Such nodes have a different parent node and are part of separate sub-trees. Example of such nodes in exploration tree 500 is node 530 and node 540. Leaves 590-598 represent classes. A leaf in an exploration tree is represented by a class ID. For example, leaf 590 represents class with class ID "A"; leaf 592 represents class with class ID "B"; leaf 594 represents class with class ID "A"; leaf 596 represents class with class ID "C"; and leaf 598 represents class with class ID "B". A leaf in an exploration tree represents a set of training records with matching class ID and is identified by the respective matching ID. For example, leaf 590 represents a training record from training records 580 with object ID "4711"; leaf 592 represents a training record from training records 580 with object ID "4712"; leaf 594 represents a training record from training records 580 with object ID "4713"; leaf 596 represents a training record from training records 580 with object ID "4715"; and leaf 598 represents training records from training records 580 with object ID "4714" and "4716". Nodes 510-540 represent views and associated features of the views and leaves 590-598 represent classes of objects classified by a role model. Branches of exploration tree 500 represent view sequences of assessed object according to the order of assessing the objects in views represented by nodes 510-540.

Exploration tree 500 may be implemented as a tree data structure. In one embodiment, the tree structure may be a directed acyclic connected graph. Nodes may have any number of child nodes. Exploration tree 500 may have one root node such as node 510 and nodes may be reached by a single path from the root node. In one embodiment, the computer system keeps an exploration tree in its permanent data store. A decision tree is constructed based on the exploration tree. The exploration tree is based on observing the role model performing classifications. Role model's class decisions and view sequences are represented by the exploration tree. In one embodiment, an exploration tree is built while a role model assesses objects' features and makes class decisions. Alternatively, the exploration tree's construction may be delayed to improve the computer system's performance Equivalent nodes represent matching views and equivalent leaves represent matching classes. For example equivalent nodes of exploration tree 500 are node 530 and node 540; leaf 590 and leaf 594 are also equivalent; and leaf 592 and leaf 598. Nodes may be equivalent, even though they are part of separate sub-trees. Similarly, sets of nodes are equivalent if their nodes are equivalent to each other. Branches are equivalent if the nodes they connect are equivalent. Sub-trees are equivalent if their nodes and branches are equivalent. In one embodiment, from mathematical perspective, branches, sub-tress, or other sets of nodes are equivalent if they are in a bijection. Identical nodes are equivalent nodes and with the same position in the tree, i.e., if they are the same nodes. In one embodiment, equivalent portions of an exploration tree may be removed, consolidated or ignored to simplify the complexity of the exploration tree.

Figure 6:
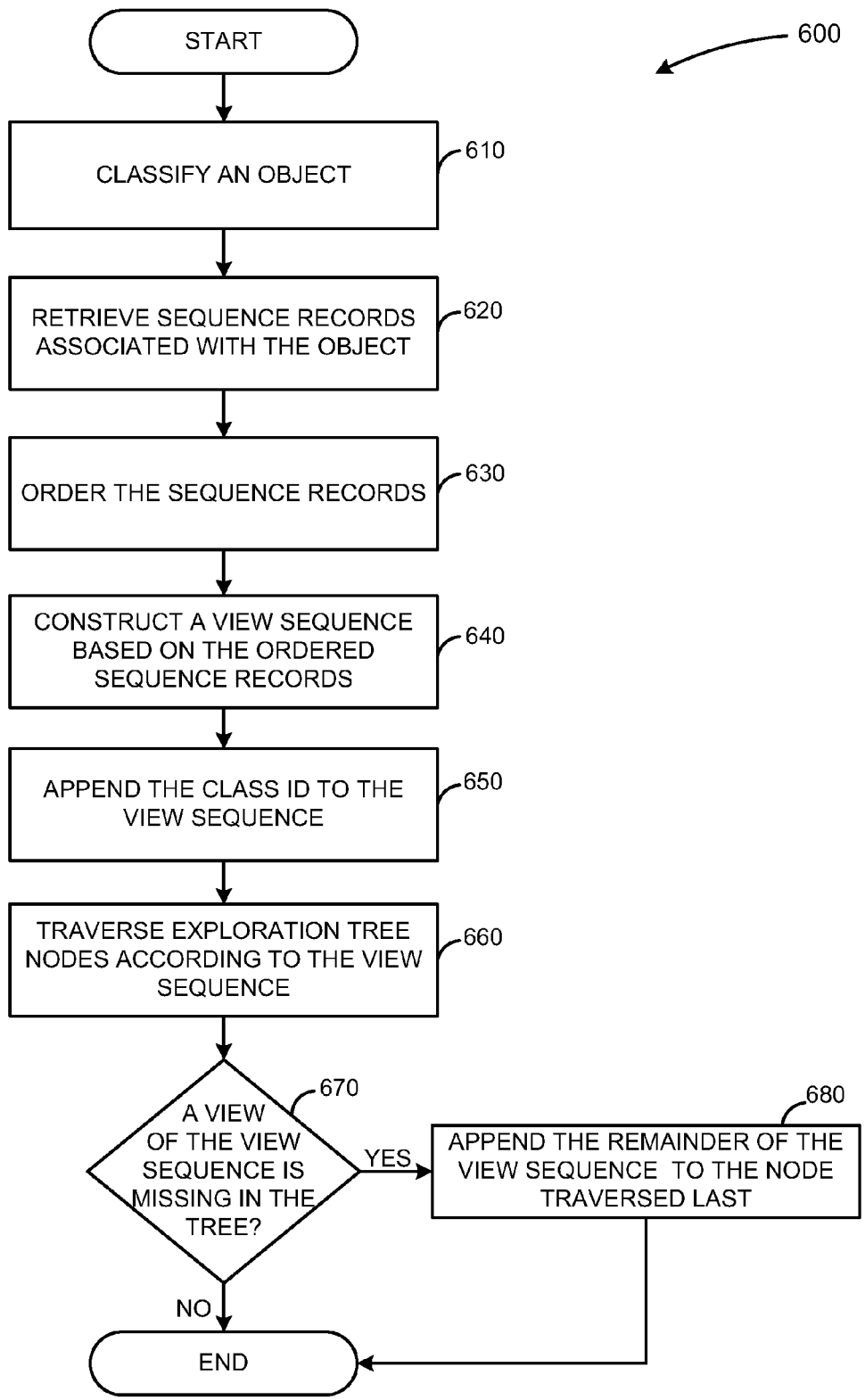
FIG. 6 illustrates a process for expanding an exploration tree in response to submitted class decision, according to one embodiment.

FIG. 6 illustrates process 600 for expanding an exploration tree based on a class decision, according to one embodiment. The process starts at 610 with classifying an object. A role model submits a class decision assigning a class to the object. Based on the class decision, a training record is generated and stored in a permanent data store. The training record contains the object ID of the classified object and the corresponding class ID of the class assigned to that object. At 620, sequence records associated with the object are retrieved. In one embodiment, from the training record the object ID of the classified object is determined. Sequence records associated with that object ID are retrieved. At 630, the retrieved sequence records are ordered. The sequence records are ordered according to the value of the "Order" field of the sequence records. At 640, based on the ordered sequence records, a view sequence is constructed. In one embodiment, by processing the sequence records in the corresponding order, an ordered list of view IDs is constructed. The constructed view sequence is based on the ordered list of view IDs. At 650, the class ID of the classified object is appended to the constructed view sequence. At 660, nodes of the exploration tree are traversed according to the view sequence. By processing the ordered list of views of the view sequence, nodes corresponding to the views in the exploration tree are traversed according to the order of views of the view sequence. At 670, a check is performed if a view of the view sequence is missing in the exploration tree. If a node in the exploration tree that corresponds to a view of the view sequence is not found in the tree, at 680, the remainder of the view sequence is appended to the node traversed last. The unprocessed portion of the view sequence is appended to the node of the tree that is traversed last. Thus, the view sequence is included in the exploration tree. The exploration tree is expanded with the view sequence that is merged to the tree. The view sequence represents the logical order of views which the role model assesses to classify an object.

Figure 7:
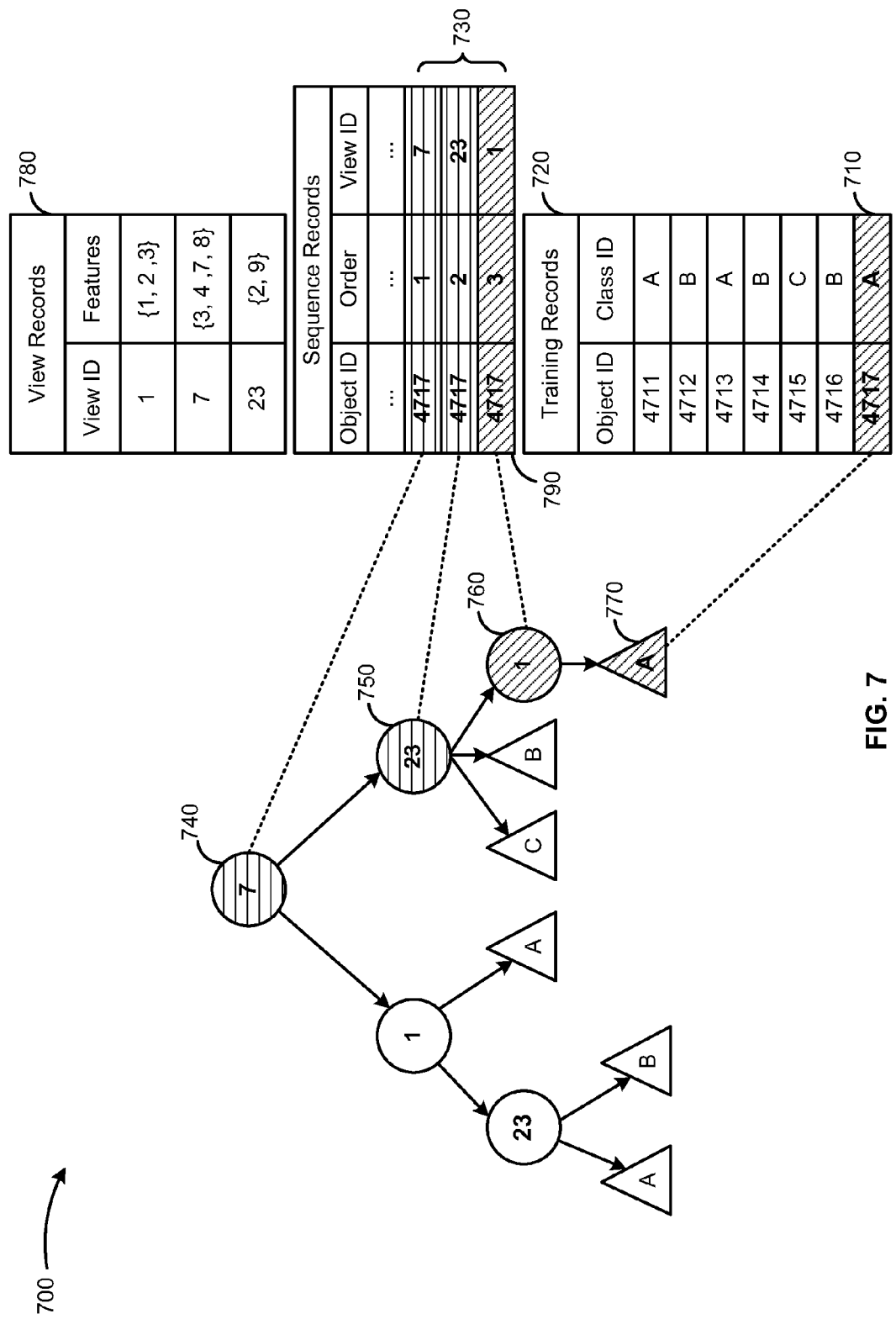
FIG. 7 illustrates an exploration tree expanded with a view sequence, according to one embodiment.

FIG. 7 illustrates an exploration tree 700 expanded with a view sequence, according to one embodiment. In one embodiment, in response to a class decision submitted by a role model, training record 710 is created in a permanent data store. The role model assigns a class to an object. Training record 710 is added to training records 720 based on the class decision. The object ID of the classified object is determined from the training record. For example, the object ID of the classified object is '4717' and the assigned class to the object is class with class ID 'A'. Sequence records 730 that are associated with the classified object are retrieved. Sequence records 730 with object ID '4717' are retrieved from the permanent data store. The retrieved sequence records are ordered. The sequence records are ordered according to the value of the "Order" field of the sequence records. Based on the ordered sequence records 730, a view sequence is constructed. By processing the sequence records 730 in the corresponding order, an ordered list of view IDs is constructed. The constructed view sequence is based on the ordered list of view IDs. For example, view IDs of the views of the constructed view sequence are first view ID '7', second '23', and last '1', respectively. The class ID 'A' is appended to the view sequence. By processing the ordered list of views of the view sequence, nodes corresponding to the views in the exploration tree 700 are traversed according to the order of views. For example, node 740 and node 750 associated with view IDs '7' and '23' are traversed in the respective order according to the view sequence. Node 760 corresponding to view with view ID '1' is missing in the exploration tree 700. The remainder of the view sequence along with the class ID is appended to the node traversed last in the exploration tree 700. For example, node 760 is appended to node 750 and leaf 770 is appended to node 760, according to the view sequence remainder. Exploration tree 700 is expanded with the view sequence. Exploration tree 700 is complemented with the remainder of the view sequence. For example, sequence record 780 is represented as node 760 appended to last traversed node 750 and training record 710 as leaf node 770 is appended to the view sequence. The ordered list of view IDs '7', '1', and '23' of the view sequence is represented as nodes 740, 750, and 760, in the exploration tree. Nodes 750-760 are appended and arranged according to the respective order of the view IDs in the view sequence. Leaf 770 representing the class id of the classified object is appended to the view sequence that yielded to the classification of the object. Corresponding features associated with the view IDs of the view sequence are kept in view records 780.

Thus, the subsets of features of the object that the role model assesses and the order in which these subsets are assessed are represented in the exploration tree. Further, the object's classification based on the assessed features is also represented in the exploration tree. The feature space is reduced to features assessed by the role model. The features assessed by the role model are features with informative, importance and discriminative potential. Further, the order in which the role model assesses subsets of features is tracked and represented in the exploration tree. Role model's decision to choose or select next important features, based on currently inspected features of an object is replicated in the exploration tree. In one embodiment, training data such as feature records, sequence records, and training records may be retrieved from any data source. For example, training data such as classified data objects may be populated to the permanent data store. In an embodiment, the resulted expanded exploration tree 700 is stored in the permanent data store. The exploration tree 700 is a possible representation of feature records, sequence records and training records that are kept in the permanent data store. In an embodiment, based on these stored records the exploration tree 700 may be built by starting from an empty tree data structure.

Figure 8:
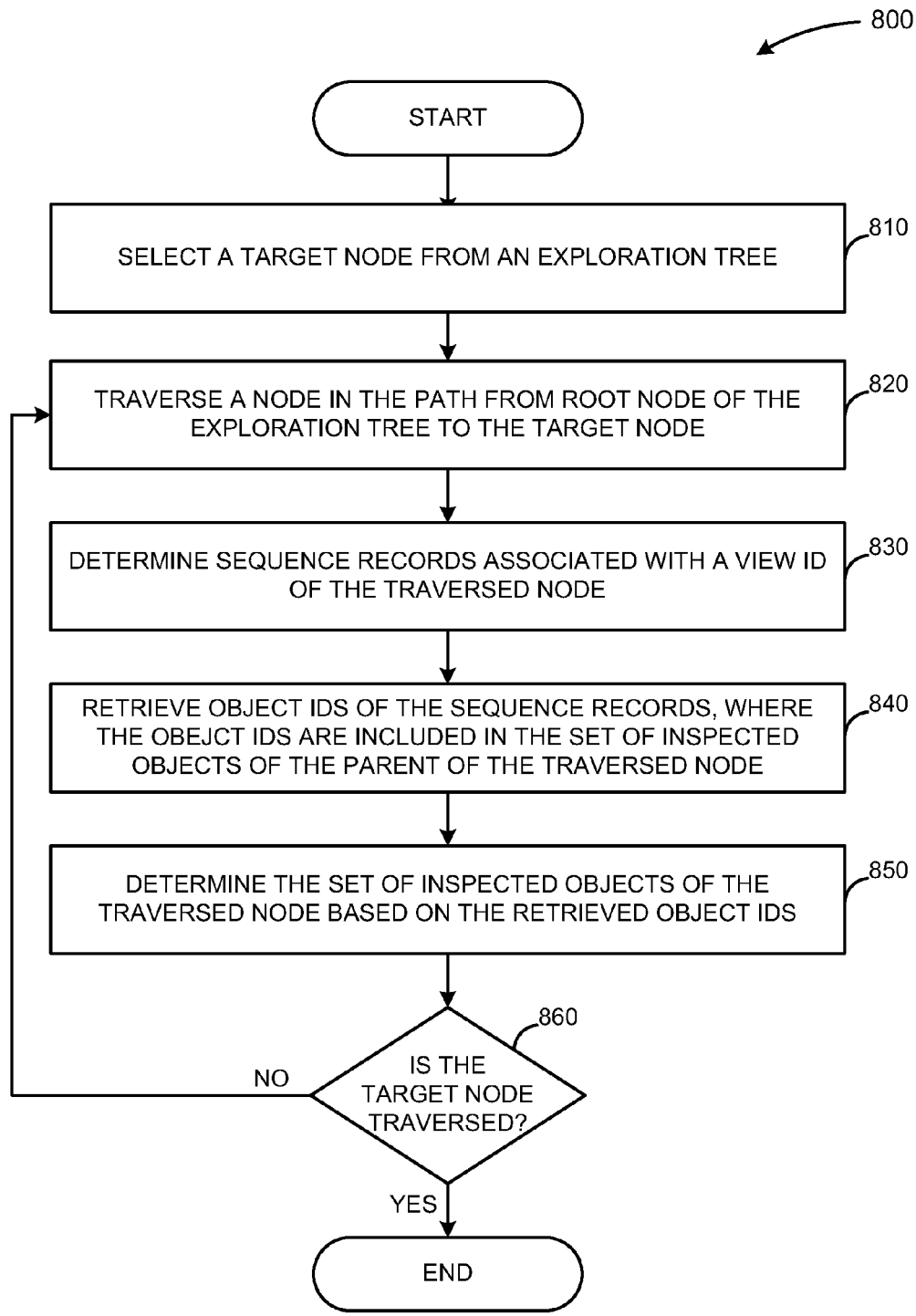
FIG. 8 illustrates a process for determining a set of inspected objects of a node in an exploration tree, according to one embodiment.

FIG. 8 illustrates process 800 for determining a set of inspected objects of a node in an exploration tree, according to one embodiment. A set of inspected objects of a node in an exploration tree is a set of object IDs a role model inspected in a view represented by the node. A set of inspected objects of a leaf is a set of object IDs the role model classified into the class represented by the leaf node. The process starts at 810 with selecting a target node from the exploration tree. At 820, traverse a node in the path from the root node of the exploration tree to the target node. At 830, sequence records that are associated with a view ID of the traversed node are determined. At 840, object IDs of the sequence records are retrieved, where the object IDs are included in the set of inspected objects of the parent node of the traversed node. Object IDs that are assessed in the view represented by the parent node are retrieved. At 850, the set of inspected objects of the traversed node is determined based on the retrieved object IDs. At 860, a check is performed whether the target node is traversed. If the target node is node is not traversed, the process continues at 820. The set of inspected objects of the target node is determined based on sets of inspected objects of nodes in the path from the root node to the target node. If the target node is traversed, the process ends, and the set of inspected objects of the target node is determined. The root node's set of inspected objects is the set of all object IDs assessed and kept in corresponding sequence records.

Figure 9:
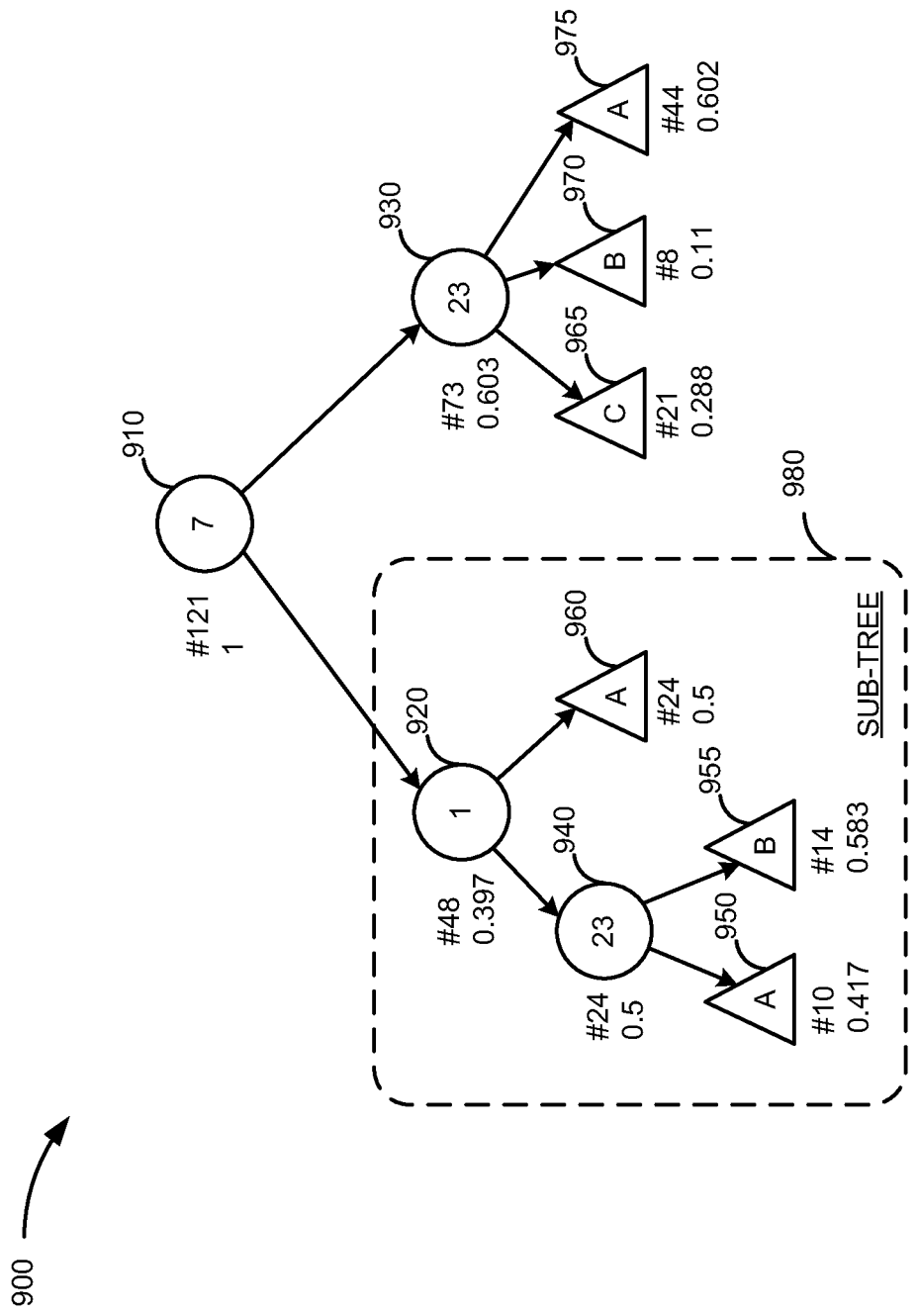
FIG. 9 illustrates nodes' traversal probability based on number of inspected objects of the nodes in an exploration tree, according to one embodiment.

FIG. 9 illustrates traversal probability of nodes in an exploration tree 900, according to one embodiment. Number of inspected objects of node 910 of exploration tree 900 is '#121'. Number of inspected objects of a node is the number of elements in the set of inspected objects of the node. Number of inspected objects of child node 920 of root node 910 and child node 930 are '#48' and '#73', respectively. '#48' objects from '#121' objects that are inspected in view with view ID '7' that is represented by node 910, are inspected in view with view ID '1' represented by child node 920. Similarly, the remaining '#73' objects are inspected in view with view ID '23' represented by child node 930. Traversal probability of the root node 910 equals 1. Traversal probability of a node is based on the number of inspected objects of the node and the number of inspected objects of the parent node. In an embodiment, traversal probability of a target node in an exploration tree may be the number of inspected objects of the target node divided by the number of inspected objects of its parent node. For example, traversal probability of node 920 equals 0.397, as the number '#48' of inspected objects of node 920 divided by the number '#121' of the inspected objects of the parent node 910 equals 0.397 Similarly, the number of inspected objects of node 940 is '#23'. The number of inspected nodes of leaves 950-975 is '#10', '#14', '#24', '#21', '#8', and '#44', respectively. In one embodiment, the number of inspected objects of a node represents the discriminative potential of the subset of features of the view associated with the node. A node with higher traversal probability indicates that the subset of features of that node may have higher discriminative potential in comparison to a node with less traversal probability. A traversal probability of a sub-tree of an exploration tree may be defined based on traversal probability of the sub-tree's root node. For example, traversal probability of sub-tree 980 is equal to traversal probability of node 930. In one embodiment, statistical methods and entropy measures may predict that a view sequence in an exploration tree has low discriminative potential. Unlike, these methods, traversal probability is based on the number of inspected objects that a role model assessed in views of the view sequence. Thus, if the role model assesses higher number of objects in the view sequence, the traversal probability is higher. Higher traversal probability may indicate that the view sequence has higher discriminative potential, as opposed to a discriminative potential that may be determined based on statistical methods. Thus, a view sequence that is determined as unimportant based on statistical methods may be determined as valuable based on traversal probability.

In one embodiment, an exploration tree may be optimized based on traversal probability of nodes. The exploration tree may be pruned to optimize a decision tree constructed based on the pruned exploration tree. Pruning is a technique in machine learning that reduces the size of a decision tree by removing sections of the tree that provide little power to classify instances. For example, branches of the exploration tree with low traversal probability may be removed from the exploration tree or may be ignored in a decision tree based on the exploration tree.

Figure 10:
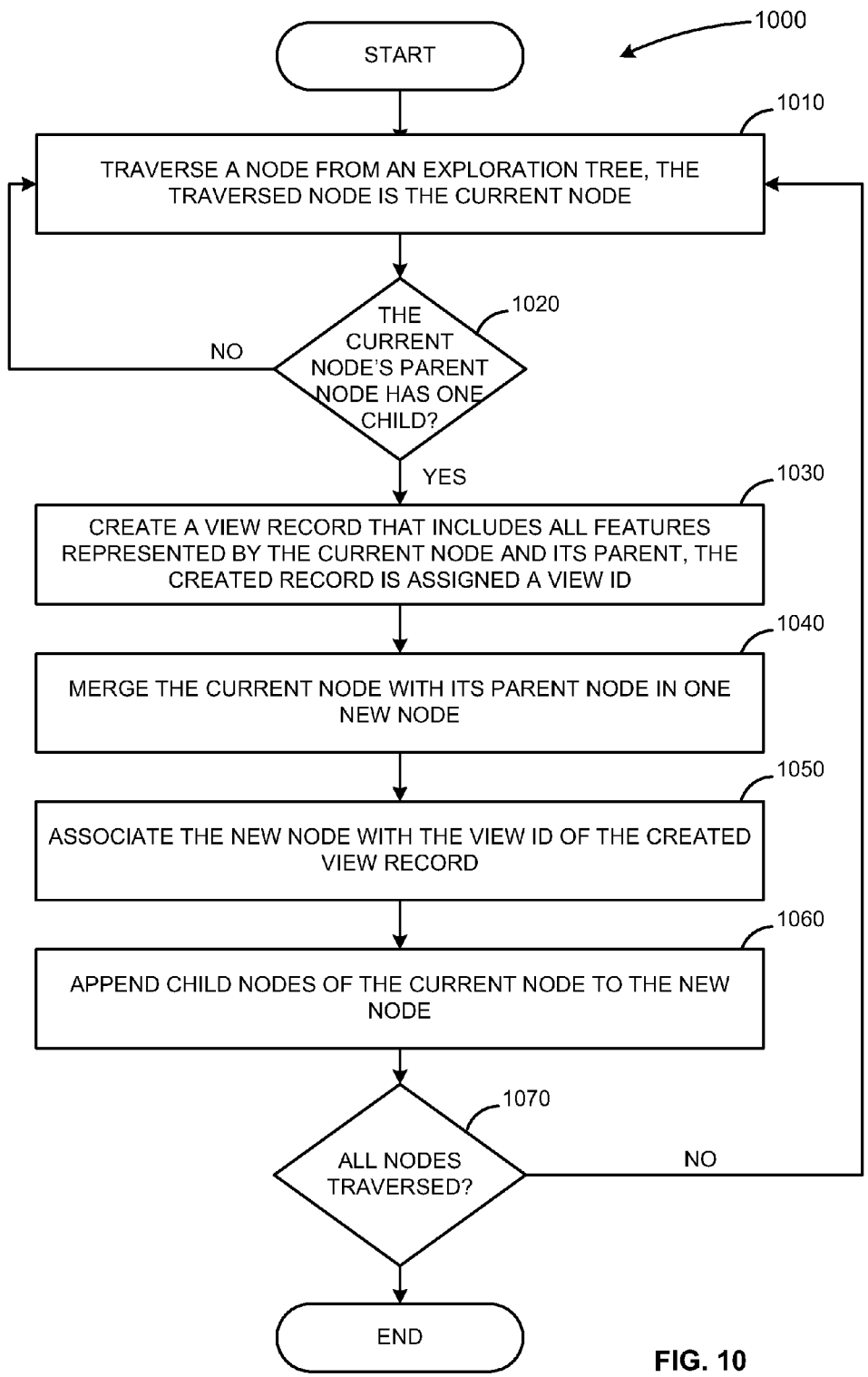
FIG. 10 illustrates a process for pruning non-decisions in an exploration tree, according to one embodiment.

FIG. 10 illustrates process 1000 for pruning non-decisions in an exploration tree, according to one embodiment. Non-decisions are sub-trees in an exploration tree that are non-branching. For example, a sub-tree is non-decision if nodes of the sub-tree have one child node, except to nodes with leaves as child nodes. Occurrence of non-decisions in the exploration tree may be a result of various actions of a role model. In one embodiment, a non-decision may indicate that the role model inspects extra views that are superfluous and that are not valuable for classification. For example, a non-decision may indicate that a role model repeatedly inspects a sequence of views to only make same class decisions. In yet another embodiment, non-decisions may indicate that the role model is indecisive or uncertain as to what views to inspect and randomly assesses the object until a view that is valuable for classifying the object is selected. In such case, if the view is the last inspected view before classification of the object, then this view may be the most valuable one. In various embodiments, non-decisions may indicate that objects' features are too numerous and complex to be inspected and represented in a single view and the role model distributes subsets of features to inspect them in several views. In such case, all views are valuable for classifying the object. In other embodiments, the source training data based on which the exploration tree is built may be not enough, for example, in an initial start up phase objects that are inspected and classified may not be enough to built proper exploration tree.

Process 1000 starts at 1010 with traversing a node from an exploration tree. The traversed node is the current node. Nodes of the exploration tree are traversed in descending order of their depth. A depth of a node may be defined as the number of nodes in the path from the root node to the node. For example, the exploration tree's root node has depth '1', its child nodes have depth '2', and so on. At 1020 a check is performed, if the current node's parent node has one child node. If the current node's parent node has more than one child node, then a non-decision sub-tree is not identified and the process continues at 1010 with traversing next node in the exploration tree according to the descending order of depth. If the current node's parent node has one child node, a non-decision is identified and, at 1030, a view record that includes all features represented by the current node and its parent is created. The created view record is assigned a view ID. Subsets of features of views represented by the current node and its parent are combined. At 1040, the current node is merged with its parent node in one new node. At 1050, the new node is associated with the view ID of the created view record. The new node represents the created view record. At 1060, child nodes of the current node are appended to the new node. Appended child nodes become child nodes of the new node. At 1070, a check is performed to determine if all nodes are traversed. If all nodes are not traversed, the process continues at 1010, with traversing the next node according to descending order of depth. If all nodes are traversed, the process ends. The exploration tree is pruned from non-decisions. By pruning non-decisions, the exploration tree's complexity may be reduced. Distinguishing between reasons of the role model's actions that that yield to non-decisions in the exploration tree, is unlikely. Therefore, subsets of features inspected in views that are part of non-decisions are retained in the feature space.

Figure 11:
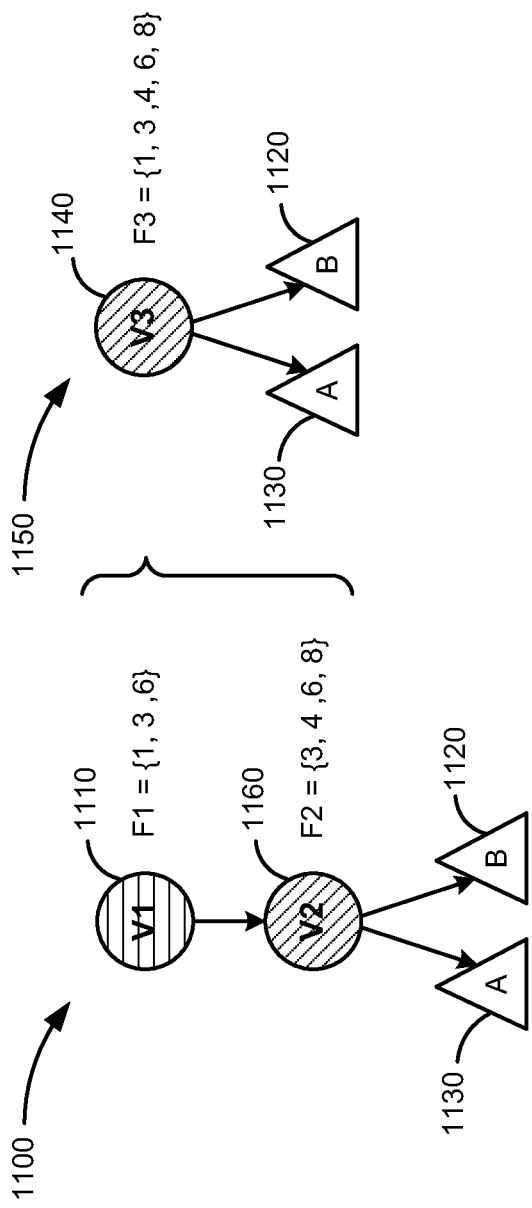
FIG. 11 illustrates a non-decision sub-tree of an exploration tree before pruning and a sub-tree after pruning the non-decision sub-tree, according to one embodiment.

FIG. 11 illustrates a non-decision sub-tree 1100 of an exploration tree before pruning and a sub-tree 1150 after pruning non-decision sub-tree 1100, according to one embodiment. Sub-tree 1100 is a non-decision sub-tree before it is pruned. According to pruning process 1000 described in relation to FIG. 10, first traversed are leaf 1120 and leaf 1130 of sub-tree 1100, according to descending order of nodes' depth. Node 1160 is parent node of leaves 1120-1130. Node 1160 has more than one child node and, thus a non-decision is not identified. Next traversed is node 1160. The parent node 1110 of node 1160 has one child. A non-decision is identified and node 1160 is merged with its parent node 1110 in new node 1140. Node 1140 is assigned view ID '3'. Subset of features F1 that includes features '{1, 3, 6}' and subset of features F2 that includes feature '{3, 4, 6, 8}' are combined in a set of features F3 that includes '{1, 3, 4, 6, 8}' and are associated with the view represented by the new node 1140 with view ID '3'. Child node 1120 and node 1130 of the currently traversed node are appended to the new node 1140 and become child nodes of node 1140. Sub-tree 1150 is pruned non-decision sub-tree 1100.

Figure 12:
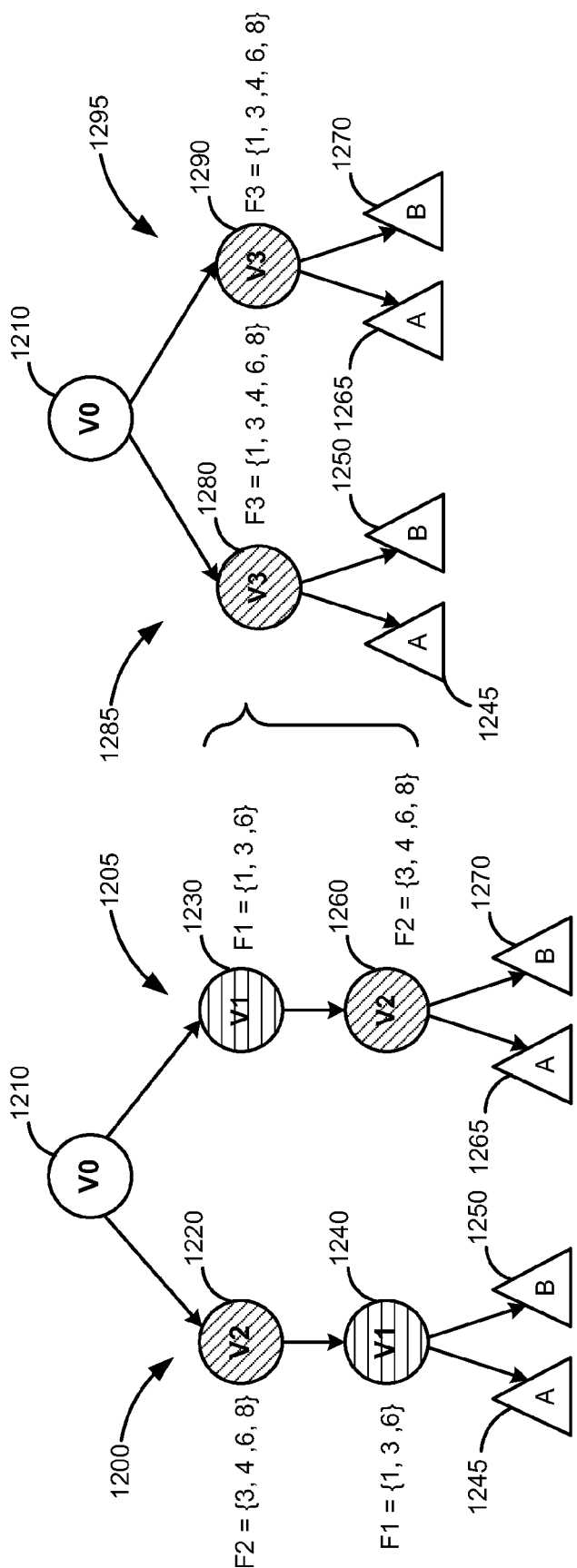
FIG. 12 illustrates pruning of permutations in an exploration tree, according to one embodiment.

FIG. 12 illustrates pruning of permutations in an exploration tree, according to one embodiment. Sub-trees in an exploration tree are permutations of each other, if they have the same parent node, if they are equivalent and if they are non-decisions. For example, sub-tree 1200 and sub-tree 1205 are permutations of each other. Sub-tree 1200 and sub-tree 1205 are equivalent as they have equivalent nodes. For example, node 1220 and node 1260 are equivalent as they represent the same view that is associated with set F2 which includes features '{3, 4, 6, 8}'; node 1230 and node 1240 are equivalent as they represent the same view that is associated with set F1 which includes features '{1, 3, 6}'; leaf 1245 and leaf 1265 are equivalent as they represent the same class 'A'; and leaf 1250 and leaf 1270 are equivalent as they represent the same class 'B'. Furthermore, sub-tree 1200 and sub-tree 1205 are non-decisions as they are non-branching sub-trees. In addition, sub-tree 1200 and sub-tree 1205 have the same root node 1210. Permutations may complicate the exploration tree and a corresponding decision tree based on the exploration tree, without contributing to classification precision. Permutations may represent redundant training data. In one embodiment, permutations are pruned to reduce the complexity of the exploration tree.

As sub-tree 1200 and sub-tree 1205 are non-decisions that may be pruned according to process 1000 described in relation to FIG. 10. As a result of pruning non-decision sub-tree 1200, node 1240 is merged with its parent node 1220 in new node 1280. Node 1280 is assigned view ID '3'. Subset of features F1 and F2 are combined in a set of features F3 that includes features '{1, 3, 4, 6, 8}' and are associated with the view represented by the new node 1280 with view ID '3'. Leaf 1245 and leaf 1250 are appended to the new node 1280 and become child nodes of node 1280. Sub-tree 1285 is pruned non-decision sub-tree 1200. As a result of pruning non-decision sub-tree 1205, node 1260 is merged with its parent node 1230 in new node 1290. Similarly, leaf 1265 and leaf 1270 are appended to the new node 1290 and become child nodes of node 1290. Sub-tree 1295 is pruned non-decision sub-tree 1205. Sub-tree 1200 and sub-tree 1205 are pruned as non-decisions. After pruning, resulting sub-tree 1285 and sub-tree 1295 are permutations. Permutations may be pruned by removing one of the duplicate or equivalent sub-trees. For example, sub-tree 1295 that is permutation of sub-tree 1285 may be removed to prune permutations. Various techniques may be applied to identify permutations in an exploration tree, including but not limited to, recursive and iterative tree traversal and string search algorithms. In various embodiments, combination of pruning non-decisions and permutations may be applied to optimize the exploration tree.

Figure 13:
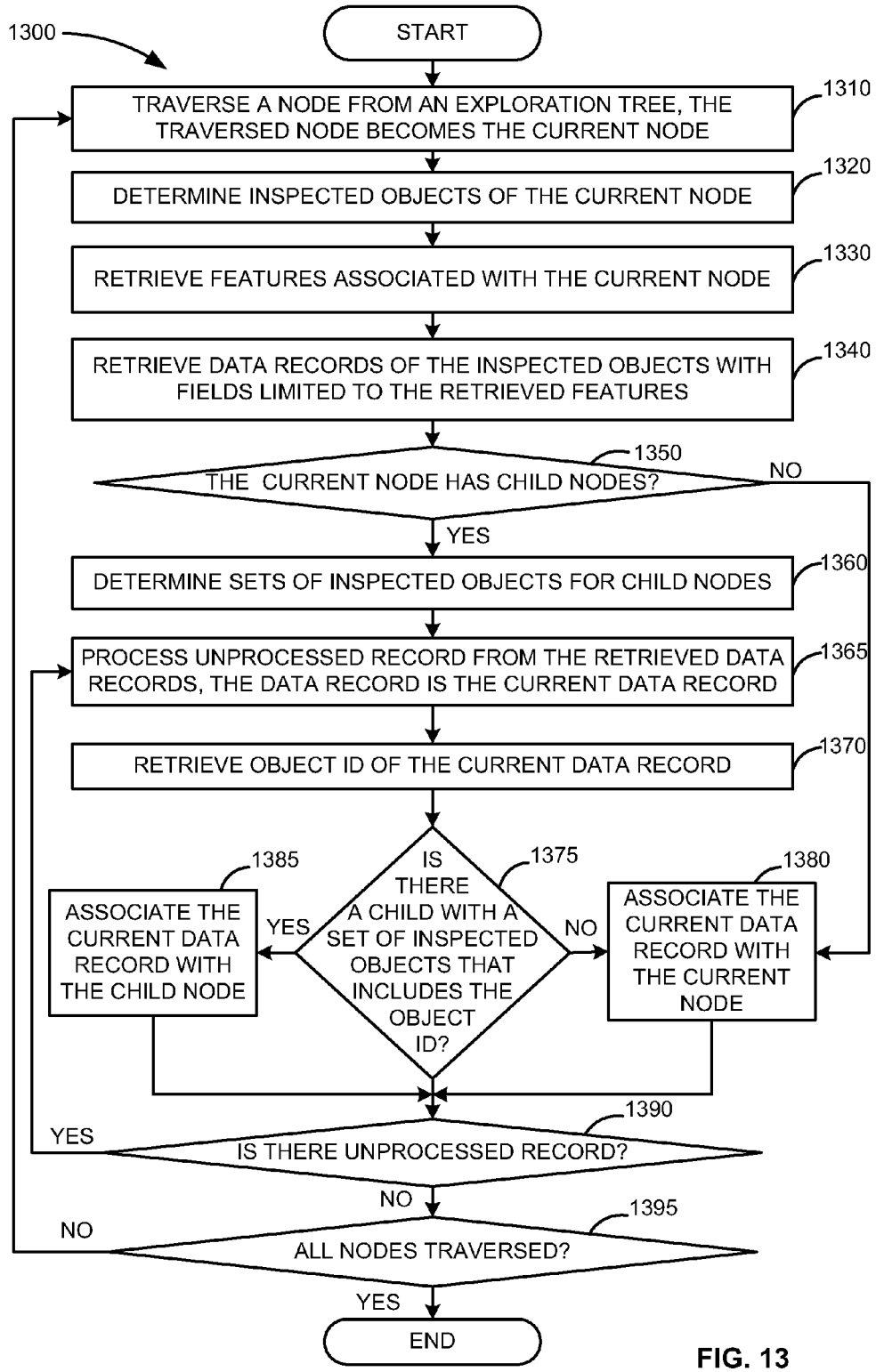
FIG. 13 illustrates a process for determining a node-specific training data, according to one embodiment.

FIG. 13 illustrates process 1300 for determining a node-specific training data, according to one embodiment. The process starts at 1310 with traversing a node from an exploration tree. The traversed node becomes the current node. Exploration tree node may be traversed in any order, including but not limited to, top-down, depth-first, bottom-up, or breadth-first order, etc. At 1320, the current node's set of inspected objects is determined. At 1330, features associated with the current node are retrieved. Features associated with a view represented by the current node are retrieved. At 1340, data records of the inspected objects are retrieved with fields limited to the retrieved features. The retrieved data records include fields that correspond to the retrieved features. Thus, feature vectors of the inspected objects are reduced. At 1350, a check is performed if the current node has one or more child nodes. If the current node has one or more child node, at 1360, sets of inspected objects of the one or more child nodes are determined. At 1365, an unprocessed record from the retrieved data records is processed. The processed data record is the current data record. At 1370, an object ID that is associated with the current data record is retrieved. At 1375, a check is performed to determine if a child node from the one or more child nodes has a set of inspected objects that includes the retrieved object ID. If there is such child node, at 1385, the current data record is associated with that child node. A field that represents the child node is added to the current data record. For example, a field with the view ID that is associated with the child node is added to the current data record. If the object ID is not included in the set of inspected objects of the one or more child nodes, at 1380, the current data record is associated with the current node. Similarly, if the current node doesn't have any child nodes, the current data record is associated with the current node. In one embodiment, if more than one child has a set of inspected objects that includes the retrieved object ID, the current data record is associated with each of these child nodes. Inspected objects of the current node are associated with a view represented by the current node or with a view represented by the one or more child nodes. Feature vectors of the current node's inspected objects are reduced to features inspected in the view represented by the current node. Thus, features of the inspected objects in the current node are reduced and filtered to features assessed by the role model. At 1390, a check is performed to determine if retrieved data records are processed. If there are unprocessed data records, the process continues at 1365 by processing the unprocessed data records. If retrieved data records are processed, the node-specific training data of the traversed node is determined. At 1395, a check is performed if all nodes of the exploration tree are traversed. If there are nodes that are not traversed, the process continues at 1310 with traversing these nodes. Otherwise, the process ends and node-specific training data of traversed nodes, is determined.

Figure 14:
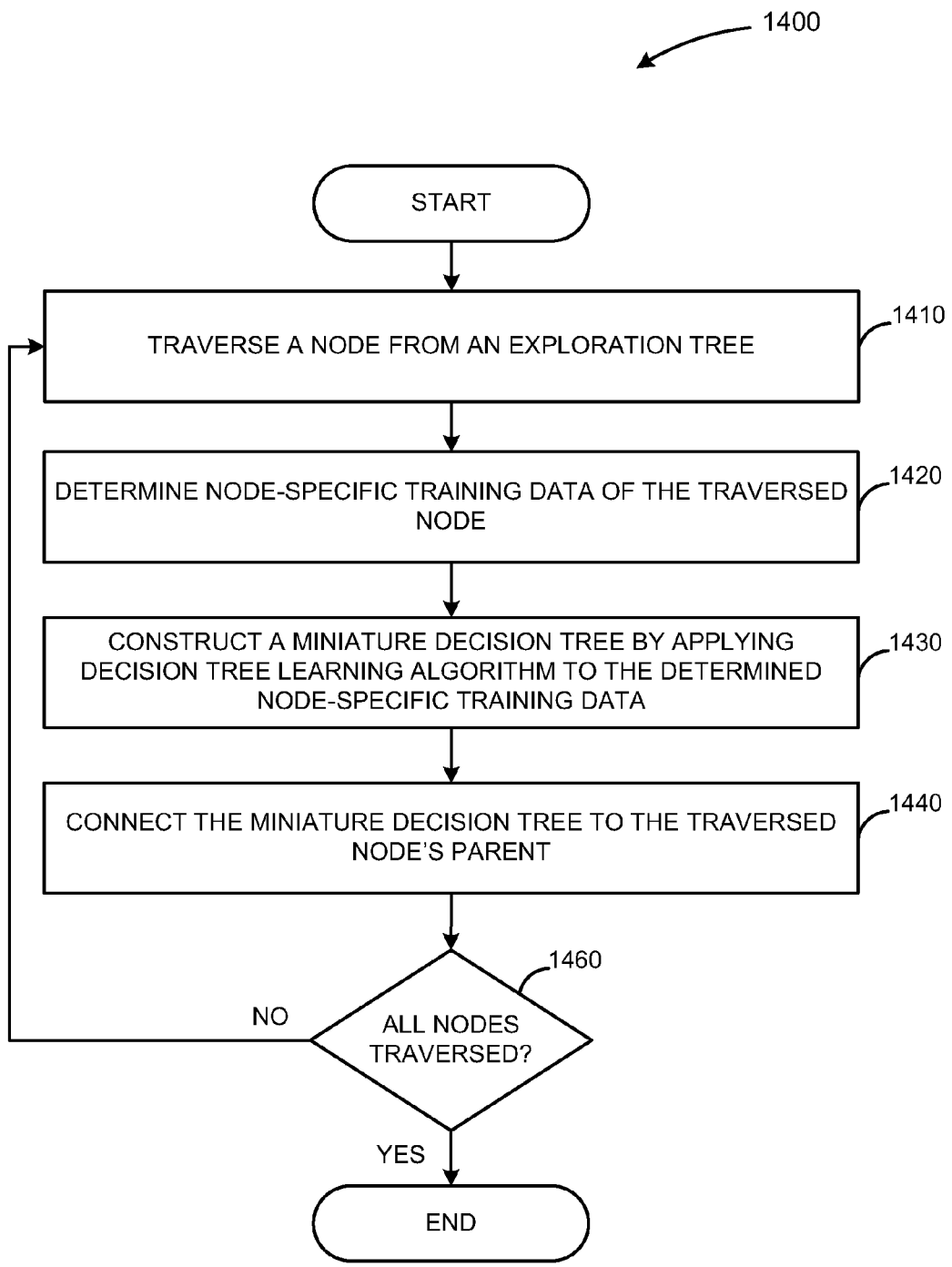
FIG. 14 illustrates a process for constructing a decision tree based on an exploration tree, according to one embodiment.

FIG. 14 illustrates process 1400 for constructing a decision tree based on an exploration tree, according to one embodiment. The process starts at 1410 with traversing a node from an exploration tree. In one embodiment, the exploration tree may be pruned. The decision tree may be constructed based on the pruned exploration tree to optimize the decision tree. At 1420, node-specific training data of the traversed node is determined. The node-specific training data may be determined in accordance with process 1300 described in relation to FIG. 13. At 1430, a miniature decision tree is constructed by applying a decision tree learning algorithm to the determined node-specific training data. A miniature decision tree is a decision tree based on portions of available training data. For example, instead of constructing a complete decision tree based on an exploration tree, miniature decision trees are constructed based on node-specific training data. A miniature decision tree may be sub-tree of the decision tree. Example of a miniature decision tree is illustrates in FIG. 15. Examples of decision tree learning algorithms that may be applied include, but are not limited to, CHi-squared Automatic Interaction Detector (CHAID), Iterative Dichotomiser 3 (ID3), C4.5, C5.0, and other suitable algorithms for generating decision trees and combinations thereof. At 1440, the miniature decision tree is connected to the traversed node's parent. The leaf node that represents the currently traversed node is replaced with the root node of the miniature decision tree. At 1460, a check is performed to determine if all nodes of the exploration tree are traversed. If there are nodes that are not traversed, the process continues at 1410 with traversing these nodes. Otherwise, the process ends. Miniature decision trees are constructed based node-specific training data of traversed nodes. A decision tree is constructed based on connected miniature decision trees.

Figure 15A:
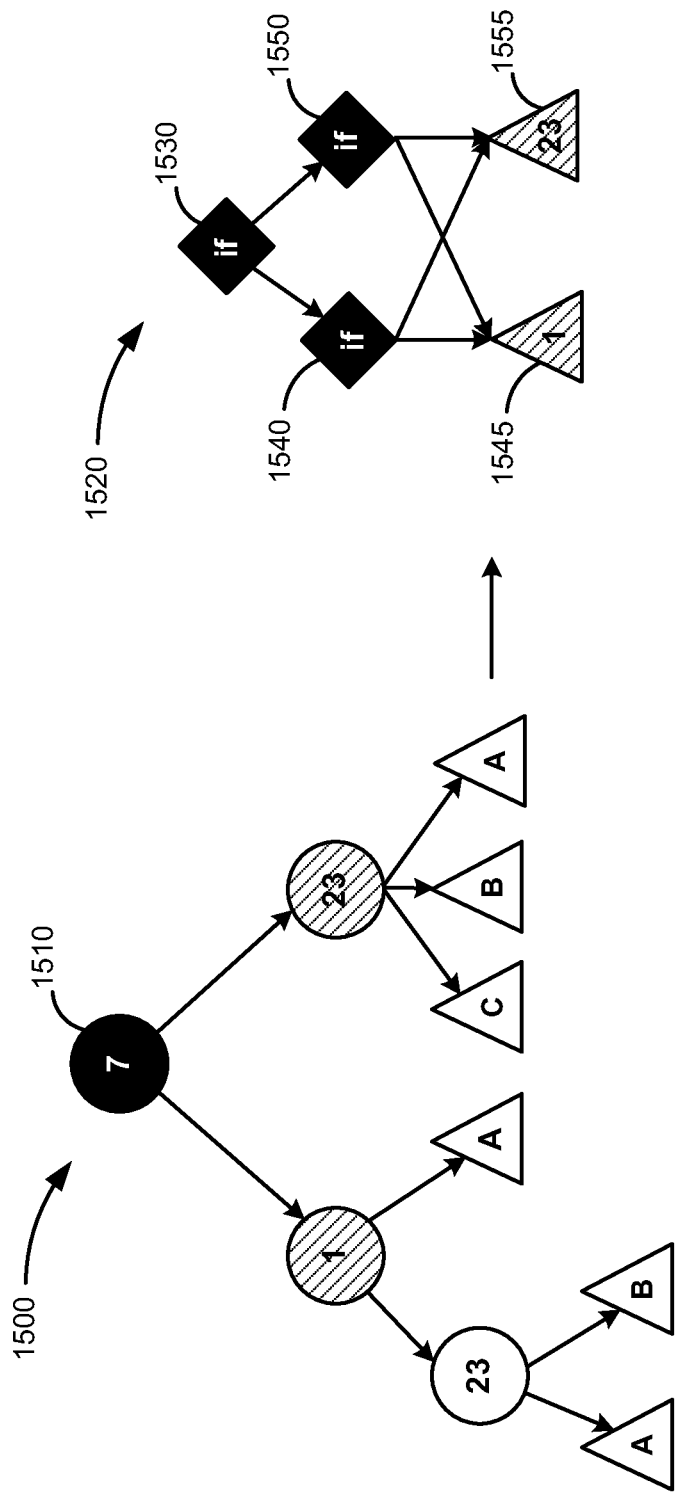
FIG. 15A illustrates a miniature decision tree, according to one embodiment.

FIG. 15A illustrates a miniature decision tree 1520, according to one embodiment. Root node 1510 of exploration tree 1500 is traversed. According to process 1400 described in relation to FIG. 14, miniature decision tree 1520 is constructed based on node-specific training data of root node 1510. Node 1530, node 1540 and node 1550 represent subset of features and respective values of those features that have discriminative potential for classification of objects. If an object is selected for classification, based on miniature decision tree 1520, a recommendation for assessing subset of features associated with node 1530 may be generated. Depending on values of the subset of features associated with the node 1530, a recommendation for assessing subsets of features associated with node 1540 or node 1550 may be generated. Similarly, depending on values of the subset of features associated with the node 1540 and node 1550, a recommendation for assessing subsets of features associated with leaf 1545 or leaf 1555 may be generated.

Figure 15B:
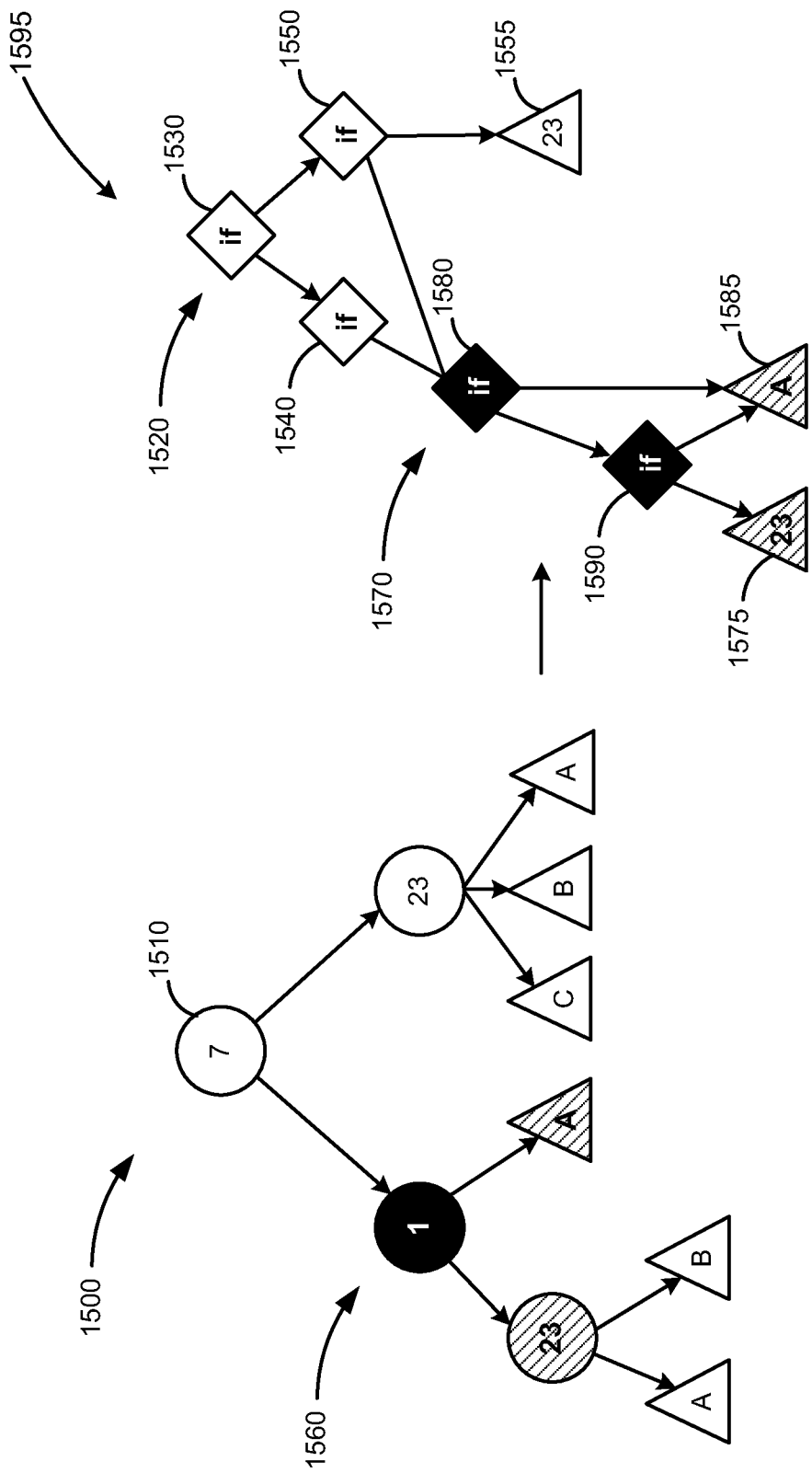
FIG. 15B illustrates connected miniature decision trees, according to one embodiment.

FIG. 15B illustrates miniature decision tree 1570 connected to miniature decision tree 1520 into decision tree 1595, according to one embodiment. According to process 1400 described in relation to FIG. 14, miniature decision tree 1570 is constructed based on node-specific training data of root node 1560. According to process 1400, leaf 1545 of miniature decision tree 1520 in FIG. 15A is replaced with root node 1580 of miniature decision tree 1570. Miniature decision tree 1570 and miniature decision tree 1520 are connected. Node 1580 and node 1590 of miniature decision tree 1570 represent subset of features and respective values of those features that have discriminative potential for classification of objects. In an embodiment, if an object is selected for classification, based on decision tree 1595, recommendations for assessing subsets of features associated with nodes 1530, 1540, 1550, 1580, 1590 or leaf 1555 and leaf 1575 may be sent to a role model assessing the object depending on values of these subsets of features. Further, depending on values of recommended for assessment subsets of features, the object may be directly classified into class 'A' represented by node 1585. Thus, decision tree 1595 may be an automated classifier. In one embodiment, an automated classifier may improve a role model's decisions by suggesting which features of an object to inspect. Further, the automated classifier may automatically classify inspected objects.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 16:
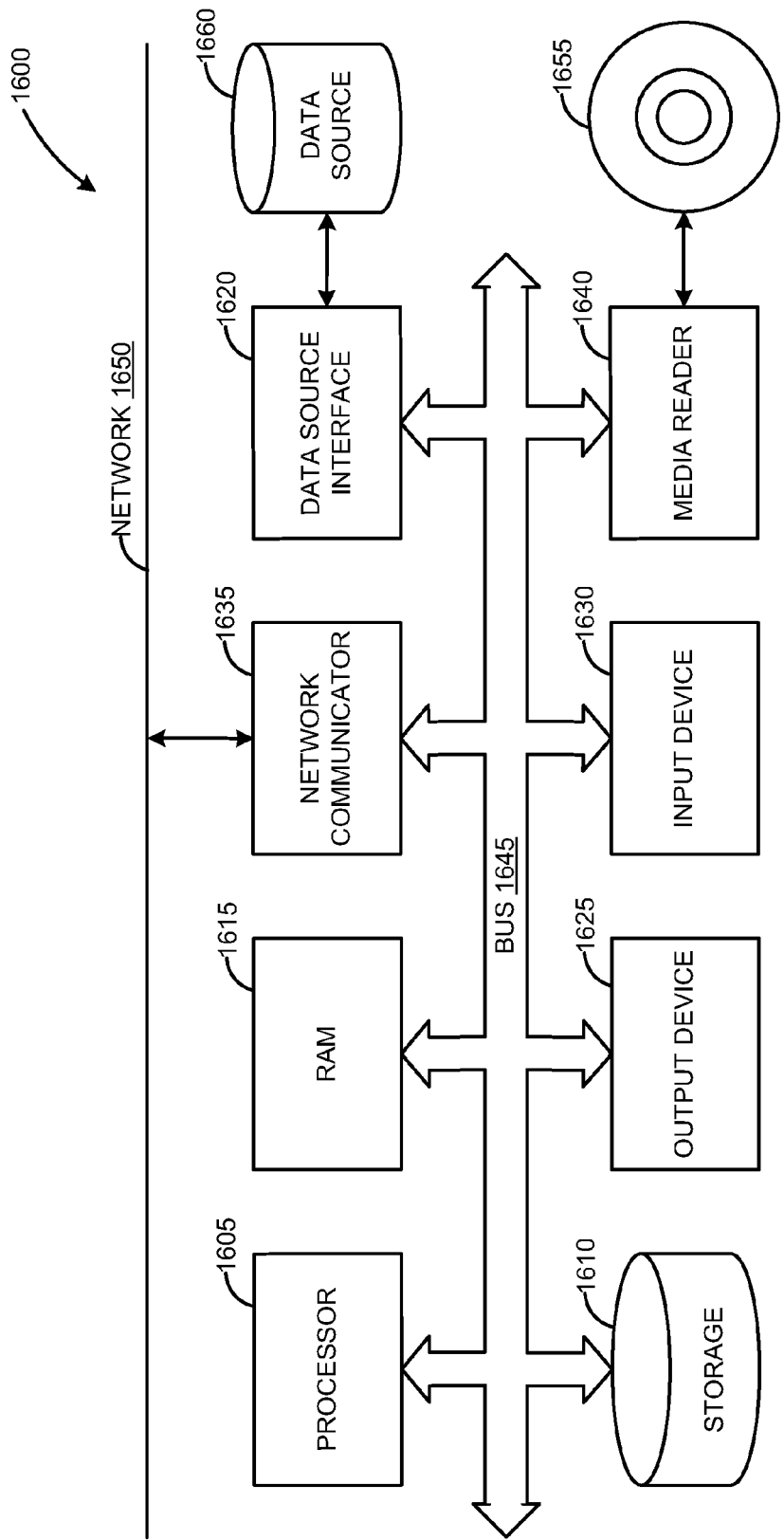
FIG. 16 is a block diagram of an exemplary computer system, according to one embodiment.

FIG. 16 is a block diagram of an exemplary computer system 1600. The computer system 1600 includes a processor 1605 that executes software instructions or code stored on a computer readable storage medium 1655 to perform the above-illustrated methods of the invention. The computer system 1600 includes a media reader 1640 to read the instructions from the computer readable storage medium 1655 and store the instructions in storage 1610 or in random access memory (RAM) 1615. The storage 1610 provides a large space for keeping static data where at least some instructions could be stored for later execution. The stored instructions may be further compiled to generate other representations of the instructions and dynamically stored in the RAM 1615. The processor 1605 reads instructions from the RAM 1615 and performs actions as instructed. According to one embodiment of the invention, the computer system 1600 further includes an output device 1625 (e.g., a display) to provide at least some of the results of the execution as output including, but not limited to, visual information to users and an input device 1630 to provide a user or another device with means for entering data and/or otherwise interact with the computer system 1600. Each of these output devices 1625 and input devices 1630 could be joined by one or more additional peripherals to further expand the capabilities of the computer system 1600. A network communicator 1635 may be provided to connect the computer system 1600 to a network 1650 and in turn to other devices connected to the network 1650 including other clients, servers, data stores, and interfaces, for instance. The modules of the computer system 1600 are interconnected via a bus 1645. Computer system 1600 includes a data source interface 1620 to access data source 1660. The data source 1660 can be accessed via one or more abstraction layers implemented in hardware or software. For example, the data source 1660 may be accessed by network 1650. In some embodiments the data source 1660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method to automatically classify a plurality of objects in a computer system by observing a role model, the method comprising:
   receiving an exploration tree, wherein:
      said exploration tree represents a plurality of view sequences associated with the role model,
      a plurality of nodes of the exploration tree represents a plurality of views, a view represents features from a plurality of features of said plurality of objects, and
      a plurality of leaves of the exploration tree represents a plurality of classes;
   assessing an object in a view sequence of said plurality of view sequences by said role model to submit a class decision, wherein said view sequence is succession of one or more views of said plurality of views, said one or more views are assessments of one or more subsets of features of said object in order of assessment;
   receiving said class decision, wherein said class decision is a classification of said object of the plurality of objects to a class of said plurality of classes;
   the computer expanding said exploration tree based on said class decision by:
      merging said view sequence from said plurality of view sequences to said exploration tree;
   the computer constructing a decision tree based on said exploration tree; and
   classifying said plurality of objects to said plurality of classes based on said decision tree.

2. The method of claim 1, wherein receiving said class decision further comprises:
   receiving a training record corresponding to said class decision, wherein said training record is created in response to classifying said object to said class by said role model.

3. The method of claim 1, wherein constructing said decision tree based on said exploration tree further comprises:
   pruning said exploration tree to optimize said decision tree.

4. The method of claim 1, wherein constructing said decision tree based on said exploration tree further comprises:
constructing a plurality of miniature decision trees for said plurality of nodes of said exploration tree; and
connecting said plurality of miniature decision trees to said decision tree.

5. The method of claim 4, wherein constructing said plurality of miniature decision trees for said plurality of nodes of said exploration tree further comprises:
determining node-specific training data for said plurality of nodes; and
applying a decision tree learning algorithm to node-specific training data of said plurality of nodes to construct said plurality of miniature decision trees.

6. The method of claim 5, wherein determining node-specific training data for said plurality of nodes further comprises:
determining sets of objects from the plurality objects inspected in views represented by said plurality of nodes; and
retrieving plurality of data records associated with said plurality of inspected objects, wherein said plurality of data records include features from said plurality of features of said plurality of objects reduced to features associated with said views represented by said plurality of nodes.

7. An automated classifier computer system to automatically classify a plurality of objects in the computer system by observing a role model, the system including:
at least one processor and memory to execute program code related to:
receive an exploration tree, wherein:
said exploration tree represents a plurality of view sequences associated with the role model,
a plurality of nodes of the exploration tree represents a plurality of views, a view represents features from a plurality of features of said plurality of objects, and
a plurality of leaves of the exploration tree represents a plurality of classes;
assess an object in a view sequence of said plurality of view sequences by said role model to submit a class decision, wherein said view sequence is succession of one or more views of said plurality of views, said one or more views are assessments of one or more subsets of features of said object in order of assessment;
receive said class decision, wherein said class decision is a classification of said object of the plurality of objects to a class of said plurality of classes;
expand said exploration tree based on said class decision by merging said view sequence from said plurality of view sequences to said exploration tree;
construct a decision tree based on said exploration tree; and
classify said plurality of objects to said plurality of classes based on said decision tree.

8. The system of claim 7, wherein receiving said class decision further comprises:
receiving a training record corresponding to said class decision, wherein said training record is created in response to classifying said object to said class by said role model.

9. The system of claim 7, wherein constructing said decision tree based on said exploration tree further comprises:
pruning said exploration tree to optimize said decision tree.

10. The system of claim 7, wherein constructing said decision tree based on said exploration tree further comprises:
constructing a plurality of miniature decision trees for said plurality of nodes of said exploration tree; and
connecting said plurality of miniature decision trees to said decision tree.

11. The system of claim 10, wherein constructing said plurality of miniature decision trees for said plurality of nodes of said exploration tree further comprises:
determining node-specific training data for said plurality of nodes; and
applying a decision tree learning algorithm to node-specific training data of said plurality of nodes to construct said plurality of miniature decision trees.

12. The system of claim 11, wherein determining node-specific training data for said plurality of nodes further comprises:
determining sets of objects from the plurality objects inspected in views represented by said plurality of nodes; and
retrieving plurality of data records associated with said plurality of inspected objects, wherein said plurality of data records include features from said plurality of features of said plurality of objects reduced to features associated with said views represented by said plurality of nodes.

13. A non-transitory computer readable medium storing instructions thereon, which when executed by a processor cause a computer system to:
receive an exploration tree, wherein:
said exploration tree represents a plurality of view sequences associated with the role model,
a plurality of nodes of the exploration tree represents a plurality of views, a view represents features from a plurality of features of a plurality of objects, and
a plurality of leaves of the exploration tree represents a plurality of classes;
assess an object from said plurality of objects in a view sequence of said plurality of view sequences by said role model to submit a class decision, wherein said view sequence is succession of one or more views of said plurality of views, said one or more views are assessments of one or more subsets of features of said object in order of assessment;
receive said class decision, wherein said class decision is a classification of said object of the plurality of objects to a class of said plurality of classes;
expand said exploration tree based on said class decision by:
merging said view sequence from said plurality of view sequences to said exploration tree;
construct a decision tree based on said exploration tree; and
classify said plurality of objects to said plurality of classes based on said decision tree.

14. The computer readable medium of claim 13, wherein constructing said decision tree based on said exploration tree further comprises:
pruning said exploration tree to optimize said decision tree.

15. The computer readable medium of claim 13, wherein constructing said decision tree based on said exploration tree further comprises:
constructing a plurality of miniature decision trees for said plurality of nodes of said exploration tree; and
connecting said plurality of miniature decision trees to said decision tree.

16. The computer readable medium of claim 15, wherein constructing said plurality of miniature decision trees for said plurality of nodes of said exploration tree further comprises:
- determining node-specific training data for said plurality of nodes; and
- applying a decision tree learning algorithm to node-specific training data of said plurality of nodes to construct said plurality of miniature decision trees.

17. The computer readable medium of claim 16, wherein determining node-specific training data for said plurality of nodes further comprises:
- determining sets of objects from the plurality objects inspected in views represented by said plurality of nodes; and
- retrieving plurality of data records associated with said plurality of inspected objects, wherein said plurality of data records include features from said plurality of features of said plurality of objects reduced to features associated with said views represented by said plurality of nodes.

* * * * *